Sept. 17, 1946.  G. C. SOUTHWORTH  2,407,690
WAVE GUIDE ELECTROTHERAPEUTIC SYSTEM
Filed May 16, 1941  4 Sheets-Sheet 1
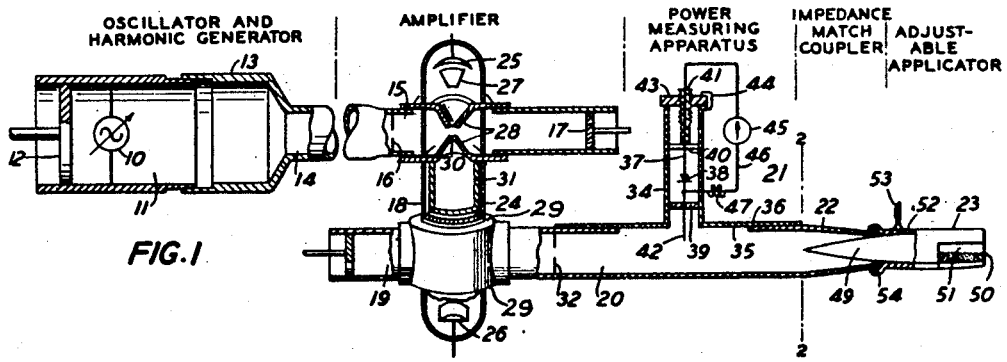
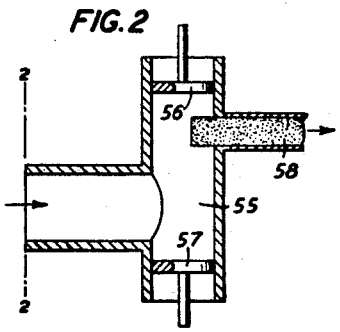
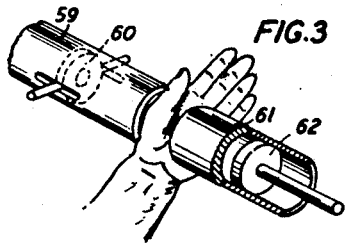
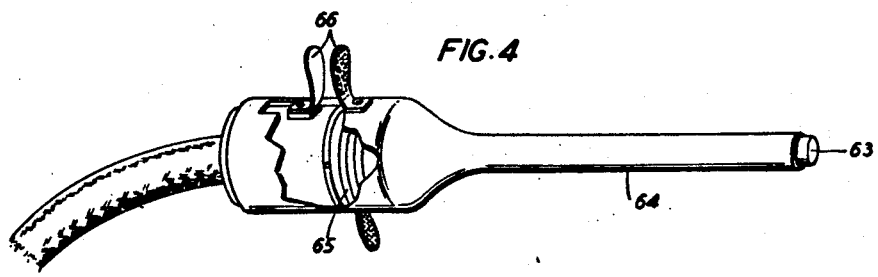
INVENTOR
G. C. SOUTHWORTH
BY E. V. Griggs
ATTORNEY

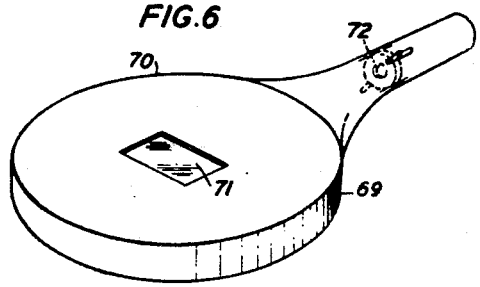
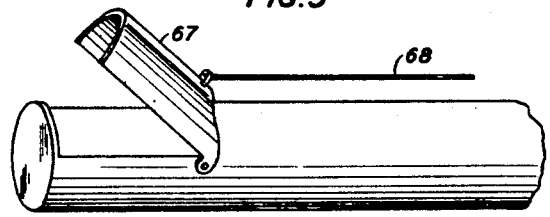
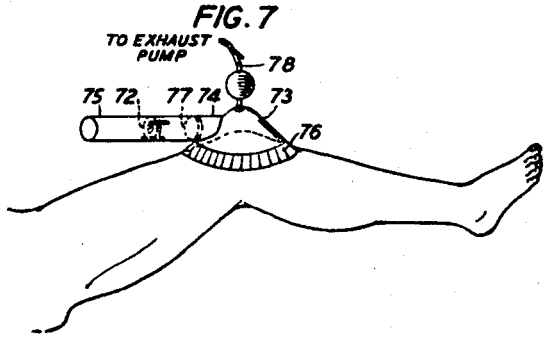

Sept. 17, 1946.   G. C. SOUTHWORTH   2,407,690
WAVE GUIDE ELECTROTHERAPEUTIC SYSTEM
Filed May 16, 1941   4 Sheets-Sheet 3
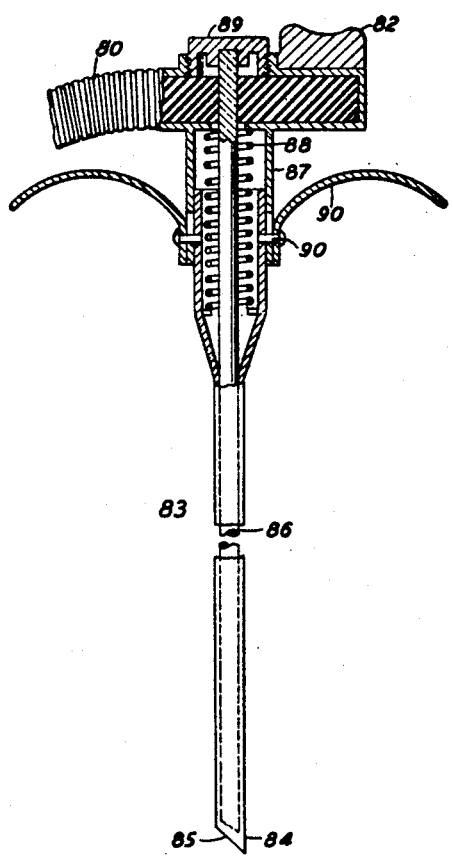
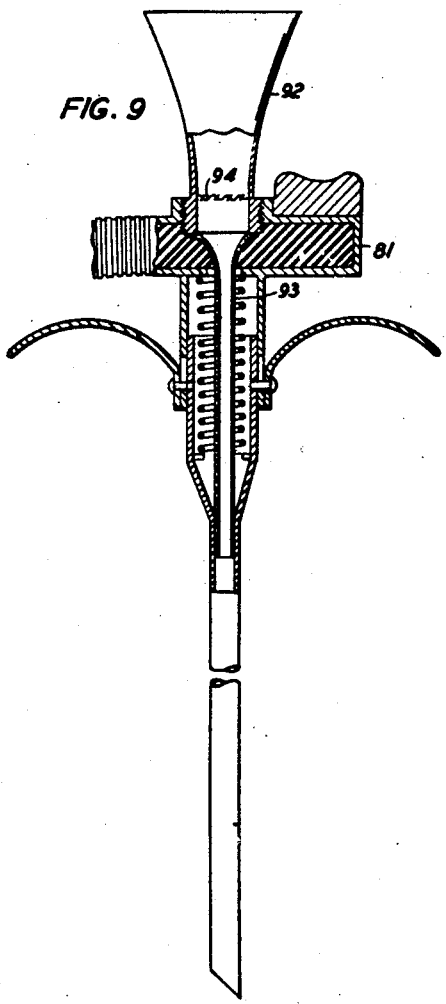
INVENTOR
G.C. SOUTHWORTH
BY
ATTORNEY Sept. 17, 1946.   G. C. SOUTHWORTH   2,407,690
WAVE GUIDE ELECTROTHERAPEUTIC SYSTEM
Filed May 16, 1941   4 Sheets-Sheet 4

INVENTOR
G.C. SOUTHWORTH
BY
E.V. Grigg
ATTORNEY

Patented Sept. 17, 1946

2,407,690

UNITED STATES PATENT OFFICE 2,407,690

WAVE GUIDE ELECTROTHERAPEUTIC SYSTEM

George C. Southworth, Red Bank, N. J., assignor to Bell Telephone Laboratories, Incorporated, New York, N. Y., a corporation of New York Application May 16, 1941, Serial No. 393,756

14 Claims. (Cl. 128—422)

This invention relates to apparatus for electrotherapeutic treatment and more particularly to such apparatus involving electric waves of extremely high frequencies.

Electric energy having wave-lengths of several meters has for some time been used for deep penetration in what is generally known as diathermy. Very much higher frequency waves are also suitable for this purpose and there are indications that they may produce still other biological effects. It has been claimed that in particular frequency ranges these waves may kill certain harmful bacteria and that in others they may be used to destroy malignant tissue.

In the past it has been customary to apply electric wave power to affected tissues by placing the affected portion in so far as possible between two plate electrodes. For example, if a rheumatic knee were involved the two plates were placed on opposite sides of the joint. In the case of lumbago one plate was placed on the muscle involved and the other on the abdomen. With certain gland difficulties one plate has taken the form of a small flattened rod that was brought as near as possible to the affected part. The other plate retained its usual form and was applied at some nearby external point.

It is obvious that in cases such as have been mentioned, a large part of the wave power has gone to parts that are unaffected by the disease. An object of this invention is to increase the efficiency of electrotherapeutic treatments by restricting the application of energy to that part of the body which is in need of treatment.

Another object of the invention is to increase the efficiency of transfer of energy from the electric wave system to the body to be treated.

An additional object of the invention is to increase the safety of electrotherapeutic treatment by confining the energy applied to the region of the disease thus removing any hazards of deranging other portions of the body which are in normal condition.

An additional feature of the invention is the provision of applicators sufficiently small to enter orifices or incisions which are not large.

A still further object of the invention is to prevent wasteful dissipation of wave energy by reflection at the surface of a body to be treated.

Another object of the invention is to enable directive application of wave energy internally of a body so as to treat a particular portion without exposing unaffected portions to unnecessary excitation.

In accordance with the invention the energy of such high frequency electric waves as lend themselves to wave guide transmission is directed to a part in need of electrotherapeutic treatment by a wave guide which is terminated in an applicator having such physical configuration as is suitable for the part to be treated and having such wave transmission properties as to transfer wave energy with high efficiency to the affected part which is to be treated.

All these objects and other features and advantages of the invention will become apparent upon consideration of the following detailed specification taken in connection with the accompanying drawings in which:

Fig. 1 illustrates a high frequency electrotherapeutic system;

Figs. 2 to 9, inclusive, show modifications of the applicator;

Figure 10:
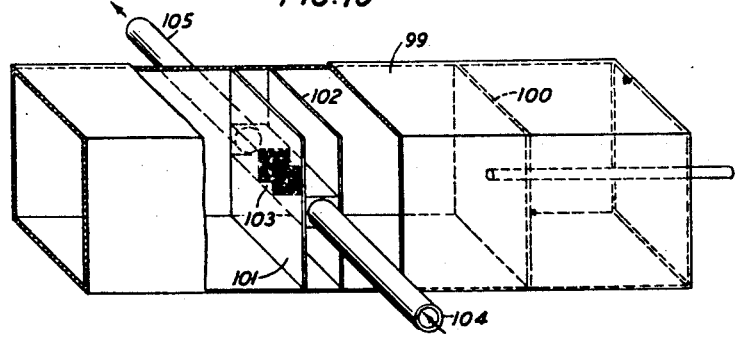
Figs. 10 and 11 illustrate details of an applicator for sterilizing fluids.

Referring to Fig. 1, a source of high frequency oscillations 10 may be of any suitable type as, for example, a magnetron oscillator. Preferably it is of a type capable of producing oscillations rich in very high frequency harmonics. The oscillator is placed within a closed resonance chamber 11 so as to electrically excite the chamber at its resonance frequency. In order to tune the chamber 11, a sliding tuner 12 and a telescoping cap 13 are employed. This enables fixing the position of the connections of oscillator 10 with respect to the chamber so as to secure the most effective coupling. The oscillator accordingly produces oscillations of a fundamental frequency determined by the tuning of the chamber 11, and harmonic oscillations. Opening into the chamber 11 is a wave guide 15 the diameter of which is not large enough to permit oscillations of the fundamental frequency to pass. Under those circumstances oscillations of the lowest harmonic frequency which the wave guide 14 will pass are accentuated and transmitted by the wave guide to resonant terminal chamber 15 tuned by an iris 16 and a piston tuner 17 to the desired harmonic. The chamber 15 is connected to the input of an electronic amplifier 18. The output of the amplifier is associated with a resonant terminal chamber 19 of a second wave guide section 20 with which is associated a power measuring apparatus 21, an impedance matching section 22 and an adjustable applicator 23.

The amplifier 18 comprises an evacuated envelope 24 preferably of dielectric material including an electron emitting cathode 25 of any suitable type but preferably one which will emit electrons in a well-defined central beam. An electron collector or anode 26 is located at the opposite end of the envelope 24. The external circuits for exciting the cathode 25 and for polarizing the collector 26 with respect to the cathode may be of conventional type and are not illustrated. Electron beam focusing device 27 for assisting in collimating the beam may be of well-known type. Circular discs 28 and 29 extend through and across the envelope 24 as extensions of the upper and lower surfaces of the resonance chambers 15 and 19. It will be understood that the resonance chambers 15 and 19 may be of any suitable contour in their cross section perpendicular to the paper but, as illustrated, the chambers are rectangular parallelepipeds. Discs 28 and 29 are each provided with conical projections extending toward each other and centrally apertured as at 30 to form short central gaps through the respective electromagnetic fields of the chambers 15 and 19 in line with the central axis of the electron beam passing from cathode 25 to collector 26. In a manner which will be well understood to those skilled in the art, the electromagnetic field within the chamber 15 will set up alternating potentials across the gap between discs 28 to vary the velocity of the electrons passing therebetween. The electron beam after variation of its electron velocity passes down through a drift tube 31 of length sufficient to enable the velocity-varied electron beam to become charge-density varied at the time that it reaches the gap between discs 29. If desired, the central dielectric portion of the envelope 24 between the inner discs 28 and 29 may be omitted and replaced by the metallic drift tube. In a manner also well known to those skilled in the art, the charge-density varied beam traversing the gap between the discs 29 reacts with the electromagnetic field in the chamber 19 to transfer energy from the beam to the field. In this manner, the harmonic oscillations selected by the wave guide 14 and the resonance chamber 15 actuate the amplifier 18 to impress upon the resonance chamber 19 oscillations of corresponding frequency and wave form but of greatly augmented intensity. These amplified oscillations are supplied by the resonance chamber 19 to the wave guide 20. The resonance chamber 19 is provided with a coupling iris 32 and a tuner 33 similar to those of the resonance chamber 15.

The power measuring apparatus 21 is similar to the structure illustrated in Fig. 5 of the U. S. Patent 2,106,713 issued February 1, 1938 to A. E. Bowen. It comprises a tubular chamber 34 mounted to slide longitudinally along a slot 35 in the wave guide 20 and provided with a shielding cover 36 to overlie the entire slot regardless of the position of the chamber 34. Supported along the central axis of the chamber 34 is a conductor 37 including in series a wave detector 38 preferably of the crystal detector type. Conductor 37 passes through the central portion of a supporting disc 39 of dielectric material and also through a central axial hole which it closely fits extending through tuner 40 and its adjusting screw 41. A free end 42 of the conductor 37 projects down into the wave guide 20 and serves in the manner of a small pick-up antenna to receive energy from the electromagnetic wave propagated through the wave guide. The tuning of the antenna comprising that portion of the conductor 37 beneath the tuner 40 is effected by manipulation of an internally threaded nut 43 retained in position by a lug 44 and engaging with the threads of the adjusting screw 41 which is attached to the tuning plunger 40. The detector 38 is electrically connected to an indicator 45 through the conductors 37 and 46, the conductor 46 passing through an insulating eyelet in the wall of chamber 34. A high frequency choke 47 may be included in the conductor 46. If the crystal response is proportional to the square of the amplitude of the high frequency current in the pick-up antenna, the dial of the indicator 45 may be readily calibrated as to show the magnitude of wave energy passing the projecting antenna tip 42. In use, chamber 34 of the wave power measuring apparatus is moved along the wave guide 20 and the indications of the indicator 45 are carefully observed. If these vary with the position of the chamber from a maximum in one position to a minimum in another, it is an indication that standing waves are being set up in the guide 20 by reflections occasioned by lack of an impedance match at some point. Accordingly, steps may be taken to readjust the various couplings and, particularly, that of the absorbing load so as to produce an impedance match and reduce such reflections. When final indication of the indicator 45 is found to be constant as the chamber is moved along the wave guide, it is evident that an impedance match has been attained. If, however, it should not be possible to secure a fully satisfactory impedance match the indicator may be moved to and left at the position of minimum indication which will represent the power passing from the source to the applicator or load and not returning. Thereafter the dosage or the amount of energy supplied to the load may be varied by varying the output of the oscillator 10 and the indicator will yield a corresponding indication.

Beyond the power measuring apparatus the impedance coupler section 22 serves to connect the guide 20 to the applicator 23. The applicator is designed to apply the guided wave energy to a body to be given electrotherapeutic treatment. The applicator comprises a core 49 of dielectric material to enable its dimensions in a thickness direction to be made as small as possible consistently with the wave-length used. Assume, for example, that the core 49 consists of ceramic material coated with sprayed metal or deposited metal as indicated at 50. A portion 51 of the core is left uncoated and is normally covered by a rotatable metallic sheath 52 to which a manipulating handle 53 is fixed. The sheath 52 is provided at its inner end with a bearing portion supported on an annular bearing flange 54 on the outer surface of the wave guide structure. Upon bringing the applicator into an incision the sheath 52 is rotated to expose affected tissues to wave energy radiated through the uncoated portion 51 of the core. In this way the treatment may be confined to a particular zone or spot thus conserving the energy and preventing deleterious action upon unaffected parts.

The impedance coupler section 22 is designed to match the impedance of the guide 20 and the applicator 23. The core 49, at its inner end is conical and dimensioned so that the solid dielectric material increases its thickness as the diameter of the impedance matching section 22 of the hollow wave guide 20 decreases.

Fig. 2 illustrates a modified impedance matching coupler and applicator which may be substituted for the elements at the right of section line 2—2 of Fig. 1. The impedance matching coupler 55 of Fig. 2 is a tunable resonance chamber provided with two slide tuners 56 and 57. These enable the chamber 55 to be given the proper tuning and at the same time enable the position of the applicator dielectric plate 58 to be properly fixed with respect to the chamber in order to secure the desired coupling between it and the chamber.

Another problem involved is that of the design of the applicator relative to the impedance of the tissues or body to be treated. The application of the open end of a wave guide to an affected part is a very simple expedient which is preferable to the present-day electrostatic plate method. When using the terminal of a wave guide as an applicator the greatest amount of power is transferred to the tissue when the impedance of the tissue matches that of the guide, that is, when there are no serious reflections at the junction of the guide with the flesh. Tissues consist mainly of water and hence may be thought of as high dielectric constant materials. It is probable that they have considerable dielectric loss. This indicates that in general for a proper match a guide of high dielectric constant, preferably K=80 or more, should be used. The use of such a material also tends toward a smaller and more convenient guide. Inasmuch, however, as tissues vary somewhat in their water content, they differ also in dielectric constant. It is, therefore, desirable to provide a system in which the apparatus is fairly flexible in its application.

Fig. 3 illustrates an expedient for inhibiting reflection from tissues. A wave guide 59 may be of the hollow open-ended type is provided near its end with an iris 60 which may be moved longitudinally toward or away from the open end of the guide. Thus the end section of the guide constitutes in effect a resonant chamber terminated by the tissue to which the open end is applied. The iris may be moved until the power indicating device indicates that there is no reflection of the wave energy. If, however, the part to which the energy is applied is not thick there may be a beam of wave energy passing through the body under treatment with reflections at the outgoing surface of the tissue. To prevent this a short section 61 of wave guide similar to that of guide 59 may be placed behind the part under treatment in alignment with guide 59 and its tuning piston 62 may be adjusted until no reflection takes place at the back or outgoing tissue surface.

Fig. 4 illustrates an applicator somewhat similar to that of Fig. 1 for treating internal parts of the body. To make the dimensions of the applicator as small as possible the space within the guide may be filled with a medium of high dielectric constant such as a ceramic loaded with titanium dioxide as, for example, the compositions sold under the names of "Al Si Mag 190" and "Condensa." This material has a dielectric constant ranging from 80 to 100 and consequently permits use of guides that range from one-ninth to one-tenth the diameter of air core guides having a similar frequency transmission range. For example, ceramic guides suitable for 10-centimeter waves (f=3000 megacycles) need be but a quarter of an inch in diameter. Stated another way, a guide of this kind 1 inch in diameter may be used for applying waves as long as 40 centimeters (f=750 megacycles).

Ceramic materials are, in general, inflexible and for this reason may be unsuitable for applicators for certain purposes. When flexibility is necessary it may be had by breaking the rod material into beads of suitable length and stringing them on an insulating cord. The over-all performance will be better if one end of each bead is convex hemispherical and the opposite end is similarly hemispherical but in a concave or cup fashion. Flexibility may also be had by making the guide of rubber and loading it with titanium dioxide. Metallic coverings for these ceramic guides may be metal pipes, sprayed metal or deposited metal. For semiflexible material the covering may be metal fabric such as is commonly used for shielding conductors in high frequency technique.

The applicator of Fig. 4 consists of a ceramic core 63 covered by a retractible metallic sheath 64. When the apparatus is not in use the sheath extends over the core sufficiently far that no waves are transmitted. It is held in its normal position by a spiral spring 65. By means of the grips 66 the sheath may be retracted as indicated in Fig. 4, to a point where wave power begins to flow and the meter connected to the movable detector indicates the required output. In general, it will be found that the sheath positions to give appreciable amounts of power output occur at half wave intervals and that one or possibly two of these exposed intervals will be sufficient. This distance will, of course, depend upon the frequencies used but for a 10-centimeter wave it will be found to be but a fraction of an inch.

In a modification the sheath may be interiorly threaded at its inner end to be retracted by rotation.

This form of applicator is adaptable to the treatment of semiexposed glands such as tonsils, or if it be made sufficiently small and flexible it may actually be passed through small ducts to affected parts as, for example, through nasal passages to sinuses.

Fig. 5 illustrates an applicator similar to that of Fig. 1 but with the sheath made up with a hinged section 67 operated by a small rod 68.

Fig. 6 shows how the open end of a wave guide may be modified to facilitate application of wave energy to the back. The design is intended to promote comfort by allowing the patient to lie in his normal dorsal position. The applicator is a separate unit 69 to which the wave guide leading to the power supply is connected. It is intended to be slipped into a bed under the patient. Essentially it is a hollow chamber perhaps 15 inches across and 2 inches deep with all sides except the top screened with metal. The top side may be covered with any one of several interchangeable sheets 70 of electrically conducting material, each having a hole 71 of different proportions from the others, through which wave energy may pass from the chamber to the body. In practical use the operator selects the cover sheet having an opening of dimensions appropriate for the area to be treated. The metal parts are made semiflexible and are coated with rubber. Since the chamber may be greatly distorted by the weight of the patient an iris 72 is provided for tuning and is made adjustable in both position and in diameter. Adjustable diameter irises are so well known in the optical and photographic arts as to require no detailed description.

Fig. 7 is an example of how the open end of a wave guide may be modified to make it more convenient to treat a knee joint. A large part of the applicator 73 is made of solid metal. This provides a chamber of more or less fixed dimensions and also a suitable connection 74 to the pipe 75 leading to the wave energy source. Outside of the solid portion of the applicator 73 there is another semiflexible part 76 made of metal fabric. The latter provides a better fit to the irregularities of the knee. The entire apparatus may be coated with rubber both for convenience of application and also for appearance and comfort. An airtight barrier 77 consisting of a tightly fitting but electromagnetically transparent disc may be placed over the end of the input pipe. With a connecting pipe 78 leading to an exhaust pump the air may be partly removed thus causing the flexible portion 76 to cling tightly to the flesh.

In Fig. 8, there is shown an applicator comprising a wave guide 80 terminating in a flat chamber 81 of circular conformation as viewed from above. To afford a convenient grip a thumb-hold 82 integral with the casing of chamber 81 is provided. The chamber 81 carries an applicator 83 resembling the usual hypodermic needle employed by physicians. This comprises a very small hollow metallic pipe 84 sharpened at its lower end as at 85 and the interior of which is filled with a needle 86 of dielectric material such as titanium dioxide. The needle 86 may have an internal diameter as small as 0.1 millimeter. The hollow pipe 84 of the applicator 83 is mounted to slide longitudinally within a cylindrical member 87. It is maintained in its normal position by an internal compression spring 88 of a well-known type which is retained between abutments on the movable pipe 84 and the cylindrical portion 87 of the applicator. A cap 89 threaded into the wall of chamber 81 carries the needle 86 and may be unscrewed from its position to remove the needle 86 when desired. When the device is to be used the tip of the applicator 83 is placed in contact with the flesh of the patient in the region of the affected part, the operator grips the thumb-hold 82 and the finger-holds 90 and presses the chamber 81 downward thus forcing the applicator through the flesh to the affected part. The finger-holds are attached to the sliding pipe of the applicator by pins 91 passing through slots in the stationary cylindrical member 87. The pins 91 also serve to hold the shell 84 from being forced outwardly by the spring 88 beyond a desired limiting position. After the tip of the applicator 83 has been forced to the position of the tissue to be treated the finger-holds 90 are squeezed toward the thumb-hold 82 thus retracting the pipe 84 toward the chamber 81 and exposing the tip of the dielectric core 86 to permit high frequency guided wave energy to be readily transmitted to the affected tissue.

Fig. 9 shows a modification of the disclosure of Fig. 8 in which the cap 89 and the needle 86 carried thereby have been removed and replaced by a funnel 92 provided with threads to screw into the wall of the shell 81. The funnel carries a glass tube 93 extending well down past the spring 88 and fitting closely within the pipe or shell portion 84 of the applicator. The funnel may be filled with an aqueous solution of high dielectric constant to constitute a guide from the chamber 81 to the tip of applicator 83. A metallic screen 94 across the lower part of the funnel permits filling the funnel 92 and the pipe 84 and at the same time precludes loss of electric wave energy from the chamber through the funnel. It will be understood that the internal diameter of the pipe 84 is sufficiently small to retain the dielectric fluid by capillary action. Upon insertion of the applicator in the tissue to be treated, energy may be applied from chamber 81 over the guiding path constituted by the pipe 84 with its liquid dielectric filling. As in the case of the device of Fig. 8 the pipe may be retracted to facilitate the energy transmission transfer between the guide and the tissue to be treated. In effect the pipe 84 is not retracted from the tissue but chamber 81 is brought closer to the tissue forcing the dielectric liquid within the shell 84 into most intimate contact with the tissue.

Sometimes it is desired to utilize high frequency electric wave energy for sterilization and pasteurization of fluids. Wave guide apparatus of the general type disclosed offers numerous advantages over ordinary electric apparatus and circuits in these processes. If the fluid be a gas with substantially the same dielectric constant as air it will be sufficient to circulate the gas through a resonant chamber in which radiation of sufficient intensity prevails. If, however, the fluid to be treated be a liquid the design must take into account the dielectric constant and the losses presented by the substance to be treated. For purposes of illustration we shall assume that the material to be treated is water and that its dielectric constant is 81. An apparatus suitable for such a treatment is shown in Figs. 10 and 11.

Figure 11:
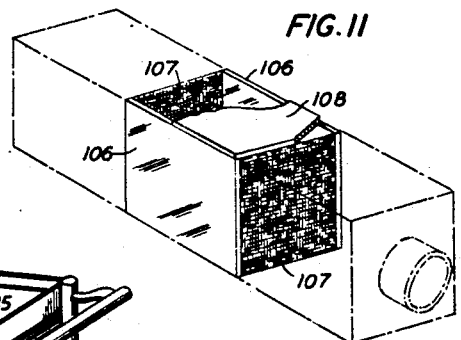

Referring to Figs. 10 and 11 a resonant metallic chamber 99 similar in general to the resonant chamber 11 of Fig. 1 is shown open at its left end for connection to a wave guide. A sliding tuning device 100 is provided for reasons which will be apparent. The chamber 99 is divided into two parts by means of two rather closely spaced metal partitions 101 and 102. Between the partitions 101 and 102 a sterilization cell 103 shown in detail in Fig. 11 passes transversely through the chamber 99. It comprises a rectangular fluid conduit having an inlet 104 for liquid to be sterilized and an outlet 105. Openings in the partitions 101 and 102 of an area roughly one-ninth that of the area of each partition expose the liquid to electromagnetic wave energy which readily passes through windows 106 of low loss dielectric material which correspond to and are contiguous with the opening. To prevent escape of wave energy beyond that portion of the sterilizing cell between the windows, end screens 107 and top and bottom metallic walls 108 are provided to permit flow of the fluid to be sterilized. This construction insures that there be a sufficient intensity of the wave energy between the windows 106 to kill germ life. The proper position of the dividing partitions 101 and 102 along the length of the chamber may be determined experimentally. The plunger 100 may assist in obtaining the most effective position for the sterilization cell relative to the length of the chamber.

Figure 12:
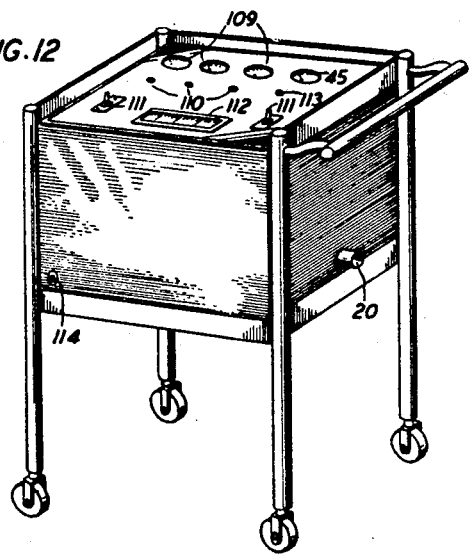
Fig. 12 shows a cabinet in which a therapeutic system in accordance with this invention may be housed.

Fig. 12 illustrates a portable cabinet assembly of a typical electrotherapeutic system in accordance with the invention. The three meters 109 indicate respectively plate voltage, plate current and filament current of the oscillator or the amplifier, as desired. For the circuits of each of these currents, there is a corresponding regulating knob 110. A meter 45 serving as a power indicator, as already explained in connection with Fig. 1 is also provided. Switches 111 respectively close the filament and plate current circuits. An indicator 112 similar in appearance to the frequency tuning indicator of an ordinary broadcast receiver is connected by a flexible wire through the rotatable control knob 113 to the movable chamber 34 of Fig. 1 carrying the detector 38. This facilitates moving the power measuring apparatus along the length of the wave guide.

The cabinet may be provided with an output wave guide section made up of a continuous spiral of interlocking metal strip so arranged as to provide a moderate amount of flexibility. It is permissible to employ 20 feet or more of this tubing if desired, since moderate bends do not materially affect the transmission. Inasmuch as the cabinet is mounted on wheels and the output guide is flexible the apparatus may be conveniently employed in almost any location. The basic power supply may be provided by means of a plug and cord of conventional type cooperating with a socket 114 in the cabinet and the customary rectifier filter may be mounted in the cabinet or the cabinet may contain batteries to energize the apparatus.

What is claimed is:

1. A wave guide system for electrotherapeutic treatment by high frequency waves comprising a tubular member having an electrically conducting surface to confine high frequency energy guided thereby, the diameter of the member being of the order of one-fourth inch, whereby the member may be inserted in small orifices or incisions and a filling within the tubular member of a finely divided substance having a high dielectric constant to increase the wave-length which the tubular wave guide is capable of handling.

2. A system for transfer of electric oscillation energy comprising a source of electrical oscillations, a wave guide having an input portion connected to the source, an energy transfer element connected to another portion of the guide, the transfer element having a terminating dielectric core which may be projected within a zone to which oscillation energy is to be transferred, a slidable electrically conducting sheath thereover to substantially enclose the core, and means whereby the sheath may be slid longitudinally to expose more or less of the core to control the amount of energy transferred from the dielectric to the surrounding zone.

3. A sterilization system comprising a fluid conduit, electric wave energy screens permeable to the fluid placed transverse to the direction of fluid flow, the conduit between said screens comprising two opposing walls of dielectric material to permit passage of electric wave energy transversely through the fluid in the zone between the screens, and the remainder of the conduit between the screens comprising electrically conducting material whereby the screens and the surfaces surrounding the zone between the screens may serve as a section of an electric wave guide.

4. A wave guide for directing electric wave energy to mass to which the energy is to be applied, an applicator for terminating the wave guide and for transferring energy to the mass comprising a core of dielectric material having a portion of its periphery coated with conducting substance to prevent escape of energy, a movable conducting sheath normally covering the uncoated portion of the applicator, and means for moving the sheath to expose a desired part of the uncoated portion to permit outflow of energy therethrough.

5. An appliance comprising a wave energy directing system for bringing wave energy to a body to which it is to be applied, a wave energy applicator connected to and serving to terminate the directing system and consisting of a hollow conducting member having a contour adapted to fit the surface of the body, and means for exhausting the atmosphere from within the applicator to cause it to hold tightly against the body whereby unwanted leakage of wave energy between the applicator and the body is prevented.

6. An appliance in accordance with claim 5, characterized in this that the periphery of the applicator fits against the body and is flexible to accommodate itself to varying conformations.

7. A system comprising a source of electric wave energy, a tubular dielectric guide connected to said source for bringing wave energy to the surface of a body upon which the energy is to be impressed and means connected to the guide for inhibiting energy reflections at the surface of the body, said means including a controllable iris within the wave guide by which the impedances of the surface of the body nearest the guide and that of the guide may be matched.

8. A system comprising a source of electric wave energy, a dielectric guide connected to said source for bringing wave energy to the surface of a body upon which the energy is to be impressed and means connected to the guide for inhibiting energy reflections at the surface of the body, said means including a tunable reflector which may be placed beyond the body as viewed from the transmitting system whereby energy reflections at the remote surface of the body may be prevented.

9. A system comprising a source of electric wave energy, a dielectric guide connected to said source for bringing wave energy from the source to the surface of a body upon which the energy is to be impressed, and means connected to the guide for inhibiting energy reflections at the surface of the body, said means comprising a device on each side of the body under treatment whereby one device inhibits reflections of wave energy as it enters the body on the one side and the other inhibits reflections of wave energy as it leaves the body on the other side.

10. An electrotherapeutic appliance comprising a tubular needle of electrically conducting material adapted to be forced into the flesh in the region of an affected part and means for supplying electric wave energy to the tubular needle at one end whereby the energy may be guided by the dielectric within the needle serving as a dielectric guide and applied at an interior point in the flesh at which the affected part is located.

11. An electrotherapeutic appliance in accordance with claim 10, characterized in this that the tubular needle is provided with a dielectric core.

12. An electrotherapeutic appliance in accordance with claim 10, characterized in this that the tubular needle is provided with a solid dielectric core.

13. An electrotherapeutic appliance in accordance with claim 10, characterized in this that the tubular needle is provided with a dielectric core comprising fluid material.

14. A system for application of electric wave energy to a mass comprising a source of electrical oscillation of the order of a few centimeters wavelength, a tubular wave guide by which the energy of the electrical oscillations is directed to the mass, the source and the wave guide having an electrically conducting sheath wholly surrounding the source and the wave guide except at the terminal of the wave guide remote from the source to prevent unwanted escape of energy, an opening in the wave guide near said remote terminal thereof, a movable conducting closure for the opening, the portion of the guide in the region of the opening having a core of dielectric material whereby the cross sectional dimension of the guide and the area of the opening may be considerably reduced, and means for controlling the position of the closure to regulate emanation of wave energy through the opening to the mass.

GEORGE C. SOUTHWORTH.